Dec. 25, 1956  R. E. SEAL  2,775,024
POWDER METAL MULTI-RING BUSHING
Filed May 29, 1953  2 Sheets-Sheet 1
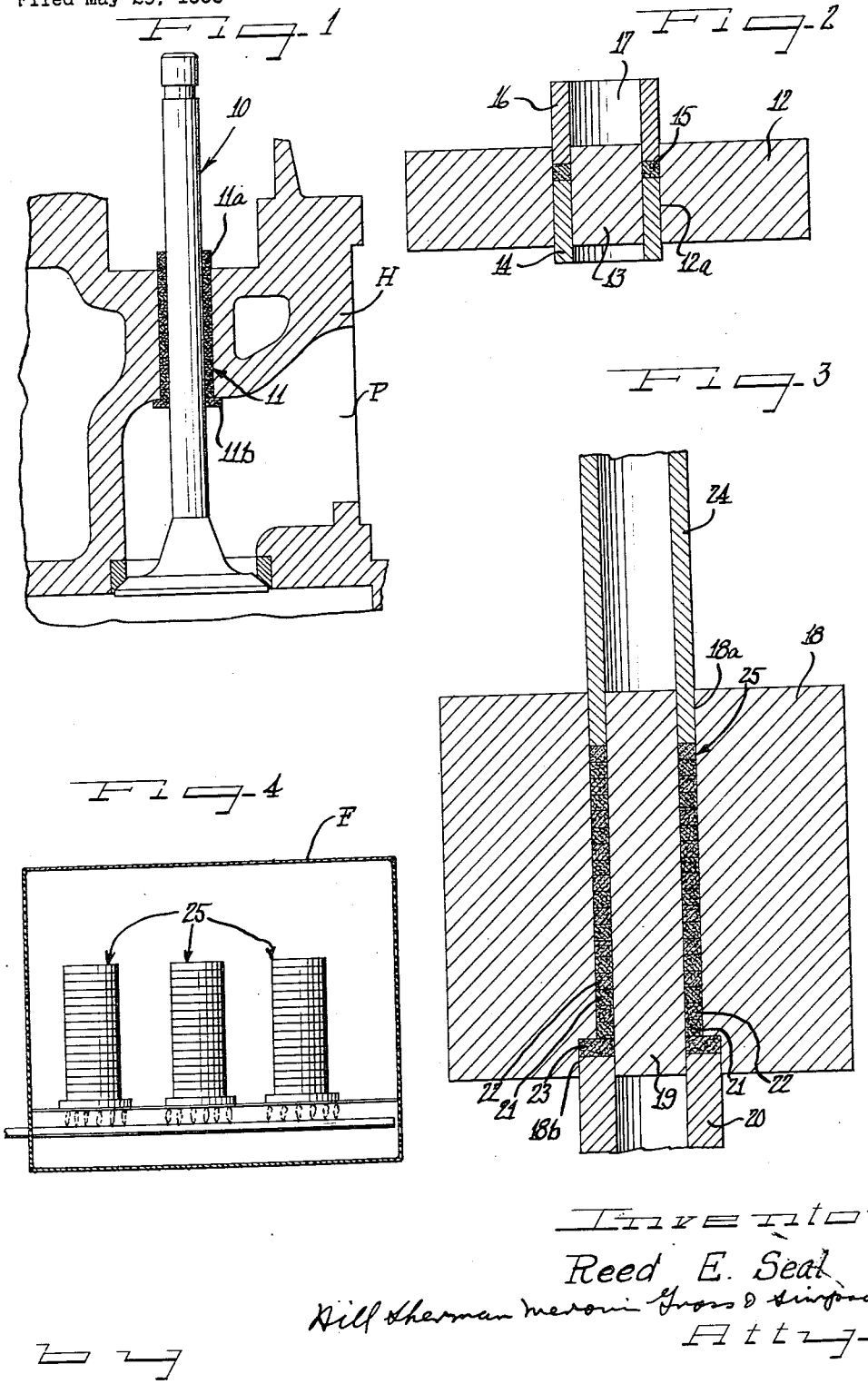
Inventor
Reed E. Seal Dec. 25, 1956  R. E. SEAL  2,775,024
POWDER METAL MULTI-RING BUSHING
Filed May 29, 1953  2 Sheets-Sheet 2
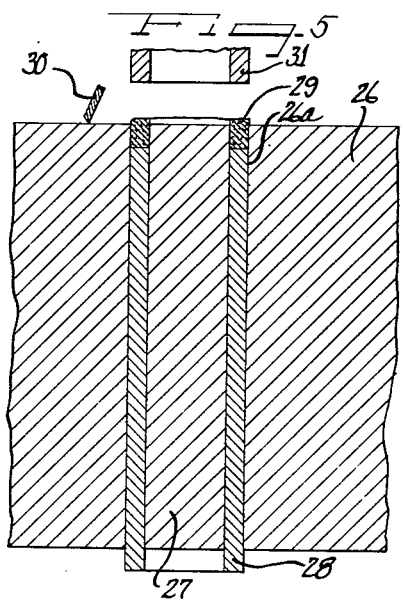
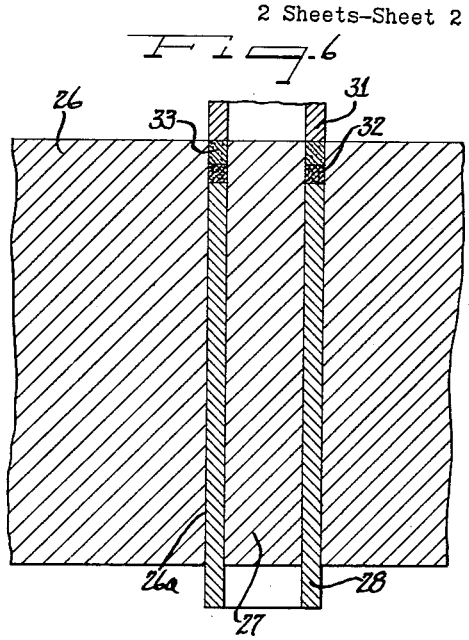
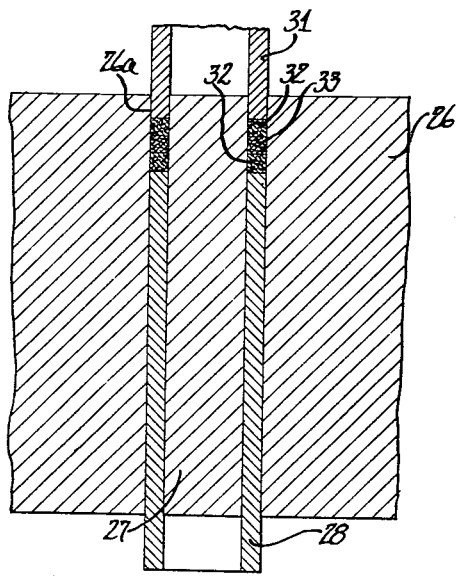
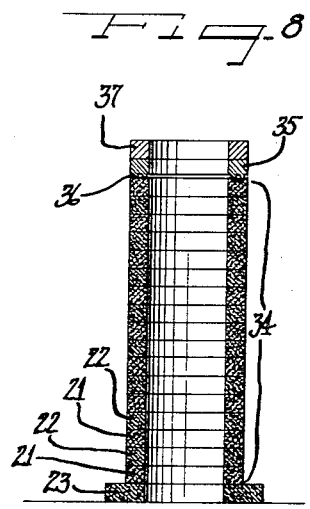
Inventor
Reed E. Seal United States Patent Office 2,775,024
Patented Dec. 25, 1956

2,775,024

POWDER METAL MULTI-RING BUSHING

Reed E. Seal, Lakewood, Ohio, assignor to Thompson Products, Inc., Cleveland, Ohio, a corporation of Ohio Application May 29, 1953, Serial No. 358,231

3 Claims. (Cl. 29—182.2)

The present invention relates to composite metal multi-ring bushings and a powder metallurgical method for producing the same. More particularly, this invention relates to engine valve stem guides composed of alternate rings of wear resisting and lubricating materials.

In recent years, the increased power and output of internal combustion engines have created large demands for metal of high wear resistance for use as engine components especially where such components are subject to appreciable friction at high temperatures. Valve stem guides or bearing bushings for engine poppet valves, and especially for the exhaust valves, have been especially vulnerable to wear and corrosion and as a result, valve seizure is quite common. Lubrication of such guides, as is customary, with oil fed to the valve stem, is not satisfactory since no lubricant is available upon starting a cold engine and upon overheating, a coking of the oil occurs to clog and jam the bearing surfaces. Failure or inaction of the lubricating system for only a short time is sufficient to permit development of excessive friction between the valve stem and its guide.

In a co-pending application of Leonard G. Daniels and Harold E. Francis, Serial No. 258,133, filed November 26, 1951, and now Patent No. 2,725,265, and assigned to the same assignee as this application, there is disclosed and claimed a method of making tubular bearing members such as valve stem guides from short tubular bearing segments composed of powdered metals such as iron, nickel, stainless steel, and the like, in admixture with anti-friction materials or lubricants such as graphite, molybdenum disulfide, tungsten disulfide, boron nitride, mica, and the like. These tubular segments are placed in end-to-end relation with powdered metal therebetween to form a bonding or cementing medium. The thus formed stack is pressed endwise and sintered.

The present invention now provides tubular bearing elements such as valve stem guides composed of alternating rings or bands of high wear-resistant alloy and bands of such an alloy in admixture with a lubricant such as molybdenum disulfide or graphite. The alternate lubricant-containing bands render the valve stem guide self-lubricating.

In one embodiment of the present invention, ring compacts of a high wear resistance material and ring compacts of a lubricant containing material are formed by compacting the powdered ingredients in dies. The compacts of high wear resistant material and the compacts of the wear resistant material-lubricant mixture are then stacked alternately and coined to form a valve stem guide bushing of relatively low density. The bushing is then preferably sintered, recoined at high pressures and re-sintered, yielding a valve stem guide of the desired wear resistance and self-lubricating properties.

In another embodiment of the invention, the stack of alternate wear resisting and lubricant containing compacts is infiltrated with copper, nickel or the like to braze the rings together and to fill the voids in the compacts.

In still another embodiment of the present invention, a continuous tube-like bushing is built up from alternate changes of wear resisting and lubricant containing metal powders in a retracting die.

The high wear resistant materials which may be employed in the instant invention can vary with the need and requirement of the particular bushing that is to be produced. In preparing bushings for use as valve stem guides in internal combustion engines, hard carburized or nitrided steel powders, or the equivalent, are used, such as the SAE 4600 series of nickel-molybdenum steels, or the SAE-50100 series of chromium steels which have been hardened by carburizing or nitriding or some other treatment.

The preferred hard wear resistant material which may be employed in the present invention is the nickel alloy, usually termed "Ni-Resist 1A," having the following general composition:

| | |
|---|---|
| Carbon | 2.8% maximum. |
| Silicon | 1.5 to 2.75%. |
| Manganese | 1.0 to 1.5%. |
| Nickel | 13.5 to 17.5%. |
| Copper | 5.5 to 7.5%. |
| Chromium | 1.75 to 2.5%. |
| Iron | The balance. |

A preferred specific "Ni-Resist 1A" analysis is:

| | |
|---|---|
| Carbon | 2.8% maximum. |
| Silicon | 2.6%. |
| Manganese | 1.25%. |
| Nickel | 16.0%. |
| Copper | 6.0%. |
| Chromium | 2.0%. |
| Iron | The balance. |

Suitable lubricant materials for the lubricating bands are molybdenum disulfide and graphite and the proportions of ingredients may be varied over a wide range to develop desired physical characteristics. Accordingly, if high wear resistance is to predominate over lubrication, the ratio of the powdered alloy to lubricating material in the powdered mixture is necessarily greater and vice versa.

When bushings are to be produced for use as valve stem guides in internal combustion engines, the composition range preferably comprises from about 3 to 50% of a powdered lubricating material such as molybdenum disulfide or graphite in admixture with from about 97% to 50% of the powdered high wear resistant material, which is preferably the same alloy used to produce the high wear resistant compacts.

The powdered metal alloys and lubricants employed in the present invention should be reduced to as fine a state of division as possible prior to being molded in the die. I have found that optimum results are obtained when the powdered alloys and lubricants have been reduced to about 250 mesh. However, this particle size may vary depending upon the size and shape of the articles being produced.

It is, then, an object of the present invention to provide a powdered metal bushing part composed of alternating bands of high wear resistant material and a lubricating material.

Another object is to provide a powdered metal valve stem guide composed of alternating bands of high wear resistant material and lubricating material.

Still another object of the present invention is to provide a powder metallurgical method of making wear resisting and self-lubricating bushings.

A further object of the present invention is to provide a method of making valve stem guides from powdered ring compacts having different desired characteristics.

Other objects and features of the invention will be apparent to those skilled in the art from the following description of the annexed sheets of drawings, which, by way of preferred examples only, illustrate several embodiments of the present invention.

In the drawings:

Fig. 1 is a cross-sectional view with parts in elevation of a valve and valve guide assembly showing the guide of this invention;

Figure 2 is a vertical cross-sectional view of a band compact forming die assembly, illustrating the manner in which the individual hard wear resistant material compacts and the wear resistant material-lubricating material mixture compacts are formed;

Figure 3 is a cross-sectional view of a coining die illustrating the manner in which the high wear resistant material compacts and the compacts of the wear resistant-lubricating material mixture are molded in an alternating fashion into a single low density composite bushing part prior to sintering;

Figure 4 is a schematic view in elevation showing the alternating band compacts coined into a single low density composite bushing part being sintered;

Figures 5 through 7 are vertical cross-sectional views of a punch and die assembly illustrating the sequence of building up a stem guide by compressing alternating layers of a high wear resistant material and layers of a mixture of a high wear resistant material and a lubricating material;

Figure 8 is a vertical cross-sectional view of a stack of rings or bands covered by a bridge ring and a copper ring for an infiltration operation.

As shown in the drawings:

In Figure 1, an internal combustion engine head H provides a port P controlled by a poppet valve 10 as is customary in automotive and aircraft engines. The stem of the poppet valve is slidably carried by a guide or bushing 11 of this invention. The bushing 11 has a tubular body 11a press fitted into a bore in the head H and a head flange 11b on the bushing is bottomed on the port wall. As illustrated, the guide or bushing 11 is composed of a stack of rings.

The rings of the guide 11 may be formed from powdered metal in compacting assembly illustrated in Figure 2. As shown therein, compacting die 12 having a cylindrical cavity 12a receives a cylindrical center post 13 disposed centrally therein inside of an annular lower punch member 14. The punch 14 slides in the cavity 12a and the post 13 slides in the punch member in closely fitting relationship therewith. A supply of a powdered high wear resistant metal or a powdered mixture of a high wear resistant material and a lubricating material 15 is distributed in the molding cavity between the die cavity 12a and post 13 on top of the lower punch member 14.

An upper punch cylindrical member 16 having an axial bore 17 of sufficient diameter to engage the outer periphery of the center post 13 is then forced into the molding cavity to compact the powdered particles to the desired density. In this manner, individual low density compact rings of either a high wear resistant material alone, or a mixture of a high wear resistant material and a lubricating material may be formed. The ingredients of these rings are described hereinbefore.

The individual band or compact thus formed has cylindrical side walls and flat end faces and may have any desired height. In forming the individual compact, I prefer to use molding pressures from about 20 to 70 tons per square inch. However, this may vary with the type of material being used, particle size, and so on.

Ring or band compacts formed as shown in Figure 2 are stacked for coining in a coining die assembly shown in Figure 3 and comprising a die body 18, with a cylindrical bore or cavity 18a having a cylindrical center post 19 disposed therein. The bottom of the bore 18a is enlarged at 18b to receive a lower punch member 20 slidably within the annular space between the wall of the die cavity and the cylindrical center post 19 in closely fitting relationship therewith. The post 19 extends from the punch into the bore 18a in spaced concentric relation therein.

The individual low density band compacts 21 of high wear resistant material and the band compacts 22 of a mixture of a high wear resistant material and a lubricating material, as formed by the method discussed under Figure 2, are stacked alternately in the annular die space described by the die bore 18a and the cylindrical center post 19, to a predetermined height. The enlarged bore 18b of the die 18 receives a larger diameter band compact 23 of high wear resistant metal to form the retaining flange 11b of the guide 11. This ring or band 23 fits snugly in the bore 18b around the post 19 on top of the punch 20. If desired, the flange forming band may be omitted to form a straight cylindrical bushing.

An upper cylindrical punch 24 snugly fits into the bore 18a and around the post 19 to compress and coin the individual compacts 21, 22, and 23 into a single self-sustaining composite bushing part 25.

The pressures used in the coining step are in excess of those used to form the individual band compacts. I prefer to use pressures about 25% to 50% greater than those employed in the initial 20 to 70 tons per square inch compacting range.

After coining, the self-sustaining composite bushing 25 is sintered for about one-half to two hours at from about 1800° F. to about 2200° F. in a furnace F which is evacuated or has a non-oxidizing atmosphere, formed of hydrogen, helium, or the like, as is shown in Figure 4. After sintering, the composite bushing 25 is removed from the furnace, cooled and recoined in the die of Figure 3 at pressures approximately 25 to 50% above those used in the first coining step. After the second coining step, the bushing is again sintered for one-half to two hours at from about 1800° F. to 2200° F. in a non-oxidizing atmosphere. The resintered bushing 25 need only have the bore thereof reamed to provide the finished stem guide 11.

The stem guide 11 may be alternately formed as shown in Figures 5 to 7. As therein illustrated, a compacting die 26 with a cylindrical cavity or bore 26a receives a cylindrical center post 27 and an annular lower punch member 28. The punch slides in the bore 26a and the post slides in the punch. A supply of a powdered hard wear resistant material 29 is distributed within the cavity of the die 26 between the bore 26a and the post 27 over the upper surface of the lower punch member 28 as shown in Figure 5. The excess powdered hard wear resistant material is struck off from the surface of the die 26 by means of the scraping bar 30 so that the surface of the powder is substantially flush with the surface of the die 26.

An annular upper punch member 31 having an axial bore of sufficient diameter to engage the outer periphery of the center post 27 is then lowered into the die cavity to compress and pressure mold the hard wear resistant material particles into a low density compact 32. After the hard wear resistant material has been so compressed into a low density compact, the lower punch member 28 is dropped or retracted a predetermined amount, as indicated in Figure 6, and the top punch 31 is withdrawn to leave a molding cavity in the die above the thus formed hard wear resistant material compact 32. This cavity is filled with a powdered mixture of a high wear resistant material and a lubricating material and leveled off. This mixture is, in turn, compressed by the upper punch member 31 to a compact 33 as shown in Figure 6.

The process of filling, leveling, compacting and retracting is repeated, alternating with the lubricant and lubricant free powders, until a single composite low density bushing of a desired height containing alternating wear resistant bands 32 and lubricating bands 33 is obtained. Although the pressure used in compressing the powdered materials may vary, depending upon the particle size and the like, I prefer to use pressures of from about 40 to 100 tons per square inch.

After the self-sustaining bushing composite is so formed in the die assembly 26, a bottom flange ring can be pressed thereon if desired and the self-sustaining unit is sintered, as shown in Figure 4, at about 1800° F. to 2200° F. in a non-oxidizing atmosphere for about one-half to two hours. The sintered unit is then reamed to form the stem guide 11.

The bushing or stem guide 11 can also be formed by infiltration, as shown in Figure 8.

In Figure 8, a stack 34 is formed of individual compacts 21, 22 and 23 as produced by the method described in Figure 2, but the individual compacts have been sintered for about one-half to two hours in a non-oxidizing atmosphere at from about 1800° F. to 2200° F. The individual sintered compacts are stacked in an alternating fashion as previously described so that a lubricating compact is sandwiched between a high wear resistant material compact and vice versa. An iron or ferrous alloy ring 35 containing two narrow annular ridges 36 on its bottom face is placed on top of the stack so that the ring rests solely on the two narrow annular ridges. A ring composed of a suitable brazing material 37, such as copper, silver solder or the like, is placed on top of the iron ring. The entire unit is then sintered, as in Figure 4, at 1800° F. to 2200° F. in a non-oxidizing atmosphere for from about one-half to two hours. This sintering treatment causes the brazing material to fuse through the iron ring and infiltrate the compacts forming a continuous bonding throughout the particle network of said compacts resulting in a bushing article displaying a high wear resistance and lubricating properties. The separation of the brazing material ring and the stacked compacts by the iron ring is desirable to prevent an erosion reaction between the brazing material and the contacts during the initial stages of sintering. The infiltrated unit is then reamed to produce the finished stem guide 11.

If desired, the wear resisting bands can be grouped and separated only at intervals with the lubricant containing bands or vice versa or low narrow bands can be alternately used with high wide bands to produce desired characteristics.

From the foregoing description, it will be understood that this invention provides a powdered metal composite bushing article of multi-ring structure displaying high wear resistance and self-lubricating properties.

It will also be understood that various modifications and variations may be effected without departing from the scope of the novel concepts of the present invention.

I claim as my invention:

1. A wear resisting and self lubricating valve stem guide comprising a superimposed stack of bands of sintered compacts of wear resistant metal powder alternated with sintered compacts of a mixture of wear resistant metal powder and discrete particles of a solid lubricant, the alternating compacts being bonded together into a self sustaining guide by autogenous bonds between the adjoining compacts.

2. A wear resisting and self lubricating valve stem guide comprising a superimposed stack of bands of sintered compacts of a nickel steel alloy powder alternated with sintered compacts of a mixture of a nickel steel alloy powder and discrete particles of a solid lubricant, the alternating compacts being bonded together into a self sustaining guide by autogenous bonds between the adjoining compacts.

3. A wear resisting and self lubricating valve stem guide comprising a superimposed stack of bands of sintered compacts of wear resisting metal powders alternated with sintered compacts of a mixture of 97 to 50 percent of a wear resistant metal powder and from 3 to 50 percent of discrete particles of a solid lubricant, the alternating compacts being bonded together into a self sustaining guide by autogenous bonds between the adjoining compacts.

References Cited in the file of this patent

UNITED STATES PATENTS

| | | |
|---|---|---|
| 1,563,663 | Seabury | Dec. 1, 1925 |
| 1,896,853 | Taylor | Feb. 7, 1933 |
| 2,167,544 | De Bats et al. | July 25, 1939 |
| 2,227,307 | Hildabolt | Dec. 31, 1940 |
| 2,341,860 | Ellis | Feb. 15, 1944 |
| 2,342,799 | Goetzel | Feb. 29, 1944 |
| 2,364,713 | Hensel | Dec. 12, 1944 |
| 2,401,483 | Hensel et al. | June 4, 1946 |
| 2,416,830 | Heuberger | Mar. 4, 1947 |
| 2,480,076 | De Marinis | Aug. 23, 1949 |
| 2,622,993 | McCullough | Dec. 23, 1952 |

FOREIGN PATENTS

| | | |
|---|---|---|
| 911,982 | France | July 25, 1946 |
| 591,319 | Great Britain | Aug. 14, 1947 |